(12) United States Patent
Jeong et al.

(10) Patent No.: US 12,199,540 B2
(45) Date of Patent: Jan. 14, 2025

(54) MOTOR DRIVING APPARATUS

(71) Applicants: Hyundai Motor Company, Seoul (KR); Kia Corporation, Seoul (KR)

(72) Inventors: Kang Ho Jeong, Hwaseong-si (KR); Myung Ho Kim, Incheon (KR); Sang Cheol Shin, Suwon-si (KR); Young Seul Lim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 159 days.

(21) Appl. No.: 17/985,408

(22) Filed: Nov. 11, 2022

(65) Prior Publication Data
US 2023/0253908 A1 Aug. 10, 2023

(30) Foreign Application Priority Data
Feb. 7, 2022 (KR) .......................... 10-2022-0015594

(51) Int. Cl.
*H02P 27/08* (2006.01)
*H02M 1/08* (2006.01)
*H02M 7/5387* (2007.01)

(52) U.S. Cl.
CPC ............... *H02P 27/08* (2013.01); *H02M 1/08* (2013.01); *H02M 7/5387* (2013.01)

(58) Field of Classification Search
CPC .......... H02P 29/02; H02P 6/085; H02P 27/06; H02M 7/493; H02M 7/49
See application file for complete search history.

(56) References Cited

U.S. PATENT DOCUMENTS

| 2009/0033253 A1 | 2/2009 | Nagashima et al. |
| 2010/0141189 A1* | 6/2010 | Matt ...................... H02P 29/032 |
| | | 318/400.26 |

(Continued)

FOREIGN PATENT DOCUMENTS

| FR | 2 910 197 A1 | 6/2008 |
| JP | 2016-181949 A | 10/2016 |

(Continued)

OTHER PUBLICATIONS

Shi Ruoyun et al: "Single-Stage Hybrid Energy Storage Integration in Electric Vehicles Using Vector Controlled Power Sharing", IEEE Transactions on Industrial Electronics, IEEE Service Center, Piscataway, NJ, USA, vol. 68, No. 11, Nov. 19, 2020 (Nov. 19, 2020), pp. 10623-10633, XP011868227.

(Continued)

*Primary Examiner* — Said Bouziane
(74) *Attorney, Agent, or Firm* — Morgan, Lewis & Bockius LLP

(57) ABSTRACT

A motor driving apparatus of driving a motor including a plurality of windings respectively corresponding to a plurality of phases is disclosed. The motor driving apparatus include a first inverter including a plurality of first switching elements and connected to a first end of each of the windings, a second inverter including a plurality of second switching elements and connected to a second end of each of the windings, and a controller configured for controlling ON/OFF states of the first switching elements and the second switching elements based on a required output of the motor, wherein the first inverter may be connected to a first voltage source, the second inverter may be connected to a second voltage source, and the first voltage source and the second voltage source may have different grounds.

14 Claims, 6 Drawing Sheets

(56) References Cited

U.S. PATENT DOCUMENTS

2019/0296678 A1* 9/2019 Omata ............. H02P 29/50
2020/0321899 A1* 10/2020 Akutsu ............. H02P 4/00

FOREIGN PATENT DOCUMENTS

| | | |
|---|---|---|
| JP | 6285256 B2 | 2/2018 |
| JP | 2020-527321 A | 9/2020 |
| KR | 10-2018-0087858 A | 8/2018 |
| KR | 10-2021-0036448 A | 4/2021 |
| KR | 10-2021-0076050 A | 6/2021 |
| KR | 10-2021-0122343 A | 10/2021 |
| WO | WO-2019159664 A1 * | 8/2019 |

OTHER PUBLICATIONS

Lathgamuwa D M et Al: "A unique battery/supercapacitor direct integration scheme for hybrid electric vehicles", ECON 2011—37th Annual Conference on IEEE Industrial Electronics Society, IEEE, Nov. 7, 2011 (Nov. 7, 2011), pp. 3020-3025, XP032104947.
Extended European Search Report dated Jun. 7, 2023, issued in corresponding European Patent Application No. 22207448.6.

* cited by examiner

MOTOR DRIVING APPARATUS

CROSS REFERENCE TO RELATED APPLICATION

The present application claims priority to Korean Patent Application No. 10-2022-0015594, filed Feb. 7, 2022, the entire contents of which is incorporated herein for all purposes by this reference.

BACKGROUND OF THE PRESENT DISCLOSURE

Field of the Present Disclosure

The present disclosure relates to a motor driving apparatus, and more particularly, to a motor driving apparatus configured to switch a motor driving mode to a Y-connection motor driving mode or an open end winding motor driving mode according to the required output of the motor to improve the efficiency of an inverter for driving the motor.

Description of Related Art

In general, windings of respective phases included in a motor are connected to an inverter at one end and connected to each other at the other end to form a Y-connection.

When the motor is driven, switching elements in the inverter are turned on or off by a pulse width modulation control and an alternating current is generated by applying a line voltage to the windings of the Y-connected motor to generate torque.

Since the fuel efficiency (or electrical efficiency) of an eco-friendly vehicle such as an electric vehicle that utilizes the torque generated by the motor as power is determined by the power conversion efficiency of the inverter-motor, it is important to maximize the power conversion efficiency of the inverter and the efficiency of the motor in order to improve the fuel efficiency.

The efficiency of the inverter-motor system is mainly determined by the voltage utilization rate of the inverter. The fuel efficiency may be improved when the operating point of the vehicle as determined by the relationship between the motor speed and the torque is formed in a section having a high voltage utilization rate.

However, since an increase in the number of windings of the motor to increase the maximum torque of the motor moves the section having a high voltage utilization rate away from a low torque region, a problem of deteriorating fuel efficiency may arise. Furthermore, from the viewpoint of fuel efficiency, when the main operating point is designed to be in a section having a high voltage utilization rate, a problem of deteriorating acceleration start performance of the vehicle caused by the limited maximum torque of the motor may arise.

Technology for driving one motor using two inverters and a mode changeover switch is recently introduced in the art to meet the demand for a motor driving technology for improving the efficiency of a system while covering both low-output and high-output sections with one motor. However, in the present method, sharing of the DC voltage by the two inverters generates a common-mode current having an n-phase component in which the sum of three-phase currents is not zero so that additional losses occur. Furthermore, a consequent decrease in the voltage utilization rate limits the voltage increase effect compared with the usual Y-connected motor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus configured to switch between motor driving modes according to the required output of the motor while reducing losses and improving a voltage utilization rate.

Technical objects to be achieved by the present disclosure are not limited to the technical objects described above, and other technical objects not described will be clearly understood by those skilled in the art to which the present disclosure pertains.

According to an exemplary embodiment of the present disclosure for addressing the technical objects described above, the motor driving apparatus of driving the motor including a plurality of windings respectively corresponding to a plurality of phases may include a first inverter including a plurality of first switching elements and connected to a first end of each of the windings, a second inverter including a plurality of second switching elements and connected to a second end of each of the windings, and a controller configured for controlling ON/OFF states of the first switching elements and the second switching elements based on a required output of the motor, wherein the first inverter may be connected to a first voltage source, the second inverter may be connected to a second voltage source, and the first voltage source and the second voltage source may have different grounds.

For example, DC-link positive DCP and DC-link negative DCN in each of the first inverter and the second inverter may be electrically disconnected from each other.

For example, the controller may turn on bottom phase switching elements among the plurality of second switching elements and turn off top phase switching elements among the plurality of second switching elements when a preset first condition is satisfied.

For example, the winding of the motor may be connected to the first inverter in a Y-connected form when the top phase switching elements are turned off and the bottom phase switching elements are turned on.

For example, one end of each of the bottom phase switches may be connected to the second end of each of the windings and the other ends of the bottom phase switches may be respectively connected to each other to form a neutral when the top phase switching elements are turned off and the bottom phase switching elements are turned on.

For example, the controller may be configured to control the plurality of first switching elements through pulse width modulation to drive the motor in a state in which the top phase switching elements are turned off and the bottom switching elements are turned on.

For example, the controller may be configured to control the first switch elements and the second switching elements through pulse width modulation to control the motor when a preset second condition is satisfied.

For example, the controller may synthesize a phase voltage command with a differential voltage of a voltage command of the first inverter and a voltage command of the second inverter.

A motor driving apparatus of driving the motor including a plurality of windings respectively corresponding to a plurality of phases may include a first inverter including a plurality of first switching elements and connected to a first end of each of the windings, a second inverter including a plurality of second switching elements and connected to a second end of each of the windings, and a controller configured for controlling ON/OFF states of the first switching elements and the second switching elements based on a required output of the motor, wherein the first inverter may be connected to a first voltage source, the second inverter may be connected to a second voltage source, the first voltage source and the second voltage source may have different grounds, and the controller may turn on only the bottom phase switching elements among the plurality of second switching elements to form a Y-connection and control the plurality of first switching elements through pulse width modulation to drive the motor as a closed end winding motor when a preset first condition is satisfied and may control the first switching elements and the second switching elements through pulse width modulation to drive the motor as an open end winding motor when a preset second condition is satisfied.

For example, a DC-link positive DCP and a DC-link negative DCN of each of the first inverter and the second inverter may be electrically disconnected from each other.

For example, when only the bottom phase switching elements are turned on among the plurality of second switching elements, one end of each bottom phase switch is connected to the second end of each of the windings and the other ends of the bottom phase switches are respectively connected to each other so that a neutral may be formed.

For example, the controller may synthesize the phase voltage command with a differential voltage of the voltage command of the first inverter and the voltage command of the second inverter.

The motor driving apparatus allows mode switching without a separate changeover switch.

Furthermore, because two voltage sources different from each other are used, the sum of the three-phase currents is zero so that losses caused by the common mode current may be prevented.

Furthermore, the use of two voltage sources allows the synthesis of a larger voltage so that the voltage utilization rate may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
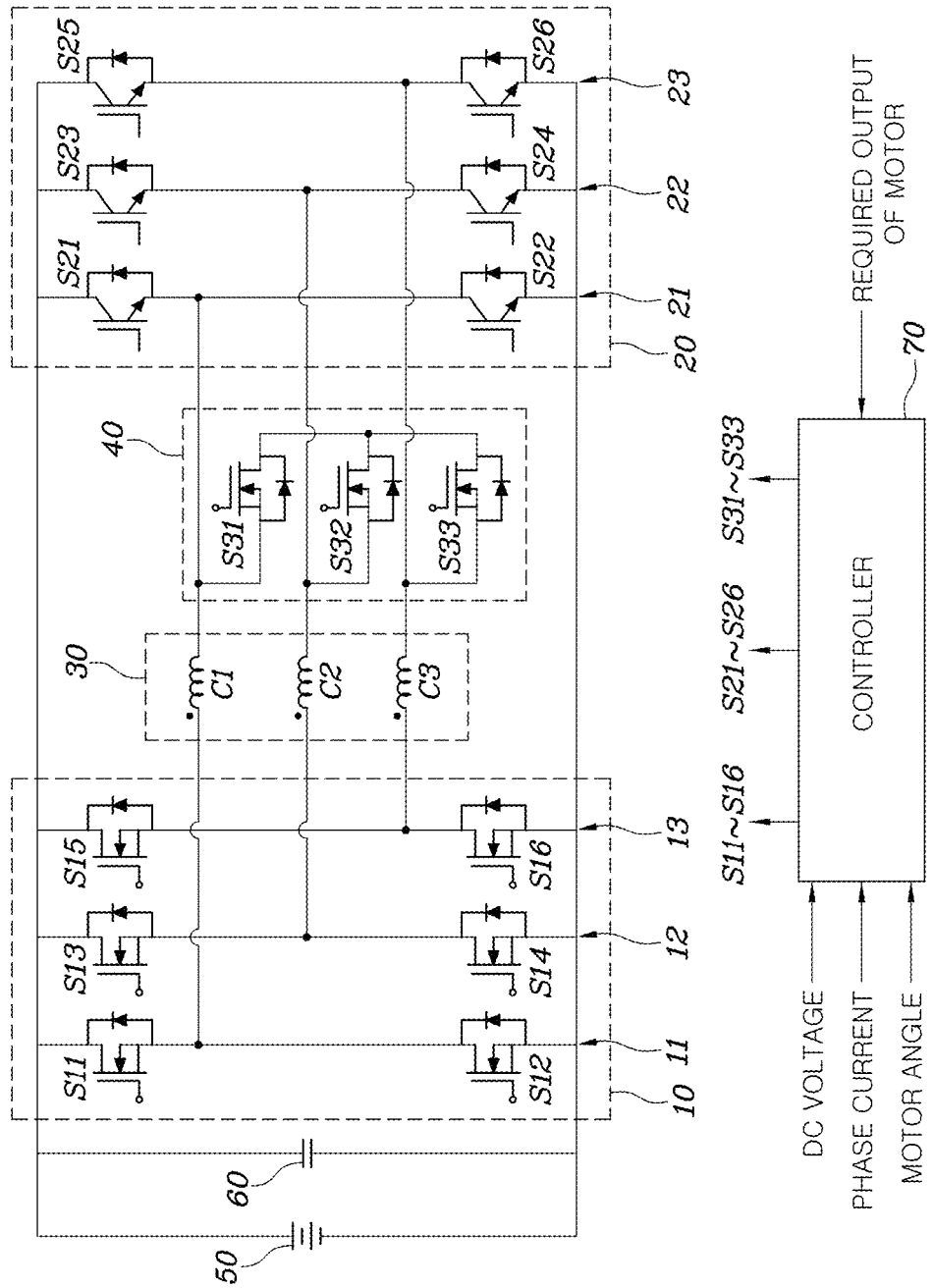
FIG. 1 is an exemplary circuit diagram of a motor driving apparatus configured to switch modes.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Embodiments included herein will be described in detail with reference to the accompanying diagrams in the following, and the same or similar components are provided the same reference numerals regardless of the figure numbers, and repetitive descriptions thereof will be omitted. The suffixes "module" and "portion" for the components used in the following description are provided or used interchangeably only in consideration of the ease of writing up the specification and do not have distinct meanings or roles in themselves. Furthermore, in describing the exemplary embodiment included in the present specification, when it is determined that specific descriptions of related technology already known may obscure the gist of the exemplary embodiments included in the present specification, the detailed descriptions thereof will be omitted. Furthermore, it is to be understood that the accompanying diagrams are only for easier understanding of the exemplary embodiments included in the present specification, that the technical ideas included in the present specification are not limited by the accompanying drawings, and that all modifications, equivalents, or substitutes of the exemplary embodiments are included in the ideas and technical scope of the present disclosure.

Terms such as first and/or second may be used to describe various components, but the components are not to be limited by the terms. The terms only serve the purpose of distinguishing one component from other components.

When a component is referred to as being "connected" or "coupled" to another component, it may be directly connected or coupled to the another component, but it is to be understood that other components may exist in between. On the other hand, when a component is referred to as being "directly connected" or "directly coupled" to another component, it is to be understood that there are no intervening components present.

Singular expressions include plural expressions unless the context explicitly indicates otherwise.

In the present specification, terms such as "comprise" or "have" are intended to designate the presence of implemented features, numbers, steps, operations, components, portions, or combinations thereof described in the specification and are not to be understood to preclude the presence or additional possibilities of one or more of other features, numbers, steps, operations, components, parts or combinations thereof in advance.

Furthermore, a unit or control unit included in the names such as a motor control unit MCU, a hybrid control unit HCU, and the like is a term used in the naming of a controller that controls a specific function of a vehicle only and does not mean a generic function unit. For example, each control unit may include a communication device communicating with other control units or sensors to control the functions it is responsible for, a memory storing an operating system, logic commands, and input/output information, and one or more processors executing judgment, calculation, and determination, and the like needed for controlling the functions it is responsible for.

FIG. 1 is an exemplary circuit diagram of a motor driving apparatus configured to switch modes.

FIG. 1 shows that a motor driving apparatus configured to switch modes is a motor driving apparatus that supplies driving power to a motor 30 including a plurality of windings C1-C3 respectively corresponding to a plurality of phases and may include a first inverter 10 including a plurality of first switching elements S11-S16 and connected to a first end of each winding of the motor 30, a second inverter 20 including a plurality of second switching elements S21-S26 and connected to a second end of each winding of the motor 30, a plurality of third switching elements S31-S33 that are respectively connected to the second end of each winding of the motor 30 at one end and that are connected to each other at the other ends, and a controller 70 controlling ON/OFF states of the first switching elements S11-S16, the second switching elements S21-S26, and third switching elements S31-S33 based on a required output of the motor 30.

The first inverter 10 and the second inverter 20 may invert the DC power stored in a battery 50 into three-phase AC power and supply the three-phase AC power to the motor 30 or may convert regenerative braking energy generated by the generation of regenerative braking torque of the motor at the time of regenerative braking into a direct current and supply the direct current to the battery 50. The conversion between DC power and AC power may be performed by pulse width modulation control of the plurality of first switching elements S11-S16 and the plurality of second switching elements S21-S26 respectively provided in the first inverter 10 and the second inverter 20.

The first inverter 10 may include a plurality of legs 11-13 to which a DC voltage formed in a DC-link capacitor 60 connected to respective end of the battery 50 is applied. Each of the legs 11-13 may correspond to each of phases of the motor 30 to form an electrical connection.

The second inverter 20 may have a similar configuration as the first inverter 10. The second inverter 20 may include a plurality of legs 21-23 to which a DC voltage formed in a DC-link capacitor 60 connected to respective end of the battery 50 is applied. Each of the legs 21-23 may correspond to each of phases of the motor 30 to form an electrical connection.

The first inverter 10 is connected to one end of the windings C1-C3 of the motor 30, and the second inverter 20 is connected to the other ends of the windings C1-C3 of the motor 30. That is, an electrical connection may be formed by an open end winding method by which each end of the windings C1-C3 of the motor 30 is respectively connected to the first inverter 10 and the second inverter 20.

The plurality of third switching elements 40 are respectively connected to the other ends of the windings C1-C3 of the motor at one end and are connected to each other at the other ends.

This connection configuration allows the other ends of the windings C1-C3 of the motor 30 to form an electrical connection to each other when the third switching elements 40 are turned on so that the motor has a Y-connected winding configuration with a neutral. Accordingly, the second inverter 20 (turning off all the plurality of second switching elements S21-S26) may be deactivated and only the first switching elements S11-S16 of the first inverter 10 may be switched through the pulse width modulation control to drive the motor 300 in a state in which the plurality of third switching elements 40 are turned on.

When the third switching elements 40 are turned off, each end of the windings C1-C3 of the motor 30 is respectively connected to the first inverter 10 and the second inverter 20. Accordingly, both the first inverter 10 and the second inverter 20 may be activated and all the first switching elements S11-S16 and the second switching elements S21-S26 may be switched through the pulse width modulation control to drive the motor 30 in a state in which the plurality of third switching elements 40 are turned off.

In the art, the mode in which the third switching elements 40 are turned on to connect the third switching elements to the other ends of the windings C1-C3 of the motor 30 and only the first inverter 10 is activated to drive the motor 30 may be referred to as a closed end winding CEW mode or Y-connected mode, and the mode in which the third switching elements 40 are turned off and both the first inverter 10 and the second inverter 20 respectively connected to each end of the windings C1-C3 of the motor 30 are activated to drive the motor 30 may be referred to as an open end winding OEW mode.

The third switching elements S31-S33 may employ various switching means known in the art, such as a MOSFET, an IGBT, a thyristor, a relay, and the like.

The controller 70 is an element that switches the switching elements S11-S16, S21-S26 included in the first inverter 10 and the second inverter 20 through the pulse width modulation control so that the motor 30 may be driven based on the required output required for the motor 30.

However, the motor driving apparatus in FIG. 1 needs a changeover switch (that is, a third switch element) separately for mode switching. Furthermore, sharing of the DC voltage of the battery 50 by the two inverters 10, 20 generates a common-mode current of an n-phase component in which the sum of the three-phase currents is not zero so that additional losses occur.

A consequent decrease in the voltage utilization rate limits the voltage increase effect in the OEW mode compared with the CEW mode in which the common three-phase Y-connected motor is applied. Only a voltage vector that makes a zero-sequence voltage ZSV zero is used in the OEW mode so that the voltage increase is limited to a maximum of $\sqrt{3}$ times the voltage in the CEW mode.

To resolve the issue, an exemplary embodiment of the present disclosure suggests that two voltage sources different from each other be used so that the DC voltage is not shared by the respective inverters, preventing losses caused by the common-mode current and increasing the voltage utilization rate.

Figure 2:
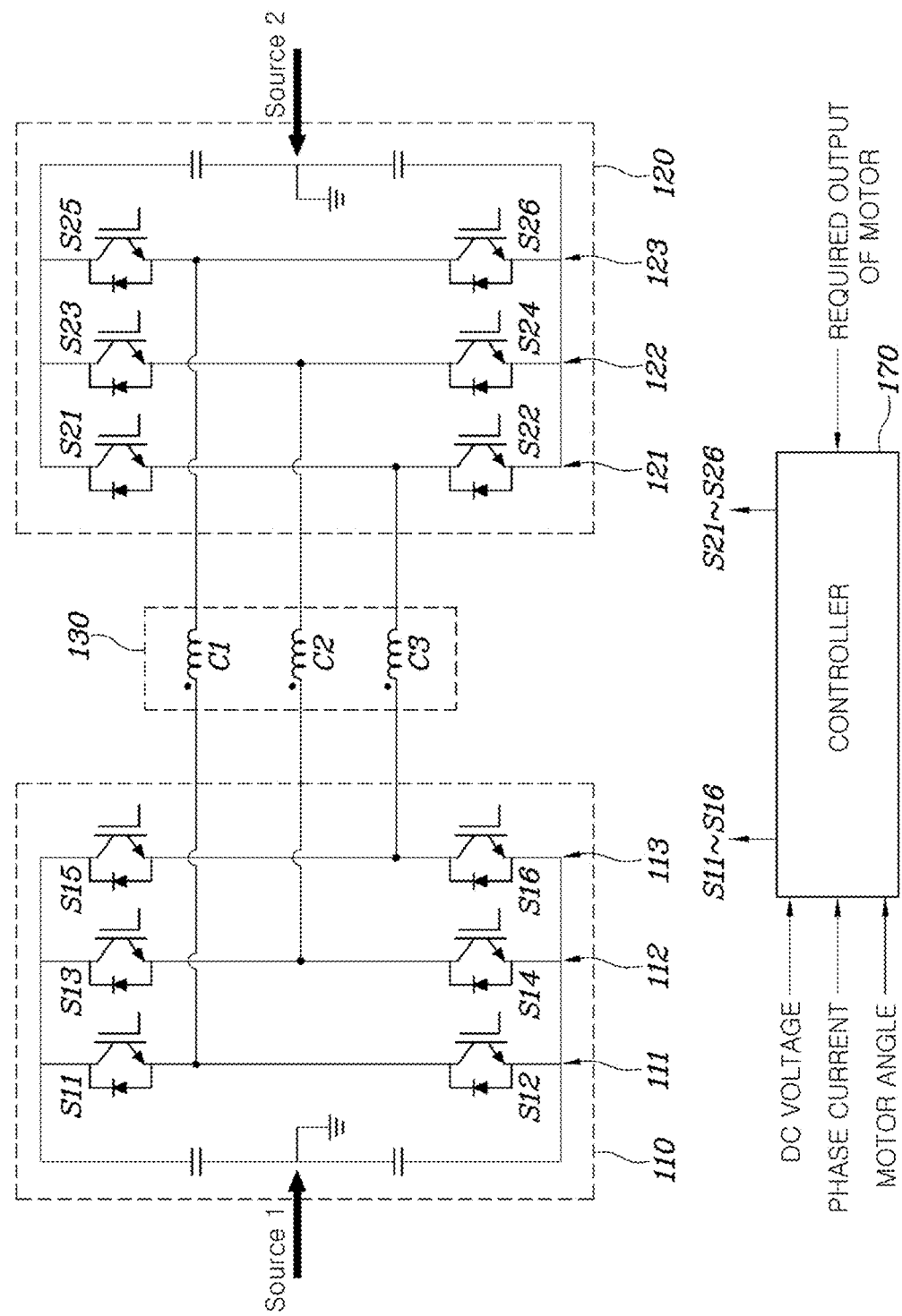
FIG. 2 illustrates an example of a circuit diagram of a motor driving apparatus according to an exemplary embodiment of the present disclosure.

FIG. 2 illustrates an example of a circuit diagram of a motor driving apparatus according to an exemplary embodiment of the present disclosure.

FIG. 2 shows that the motor driving apparatus according to an exemplary embodiment of the present disclosure is a motor driving apparatus that supplies driving power to a motor 130 including a plurality of windings C1-C3 respectively corresponding to a plurality of phases and may include a first inverter 110 including a plurality of first switching elements S11-S16 and connected to a first end of each winding of the motor 130, a second inverter 120 including a plurality of second switching elements S21-S26 and connected to a second end of each winding of the motor 130, and a controller 170 controlling ON/OFF states of the first switching elements S11-S16 and the second switching elements S21-S26 based on a required output of the motor 130.

However, unlike the motor driving apparatus described above with reference to FIG. 1, in which one battery 50 supplies power to two inverters 10, 20, the motor driving apparatus according to the exemplary embodiment of the present disclosure utilizes two voltage sources Source 1, Source 2. Accordingly, DC-link positive DCP and DC-link negative DCN of the first inverter 110 are not electrically connected to the DCP and DCN of the second inverter 120 respectively in the motor driving apparatus according to the exemplary embodiment of the present disclosure, unlike FIG. 1 in which the DCPs and DCNs of the first inverter 10 and the second inverter 20 are electrically connected to each other respectively.

The first inverter 110 may include a plurality of legs 111-113 to which a DC voltage is applied from the first voltage source SOURCE 1. Each of the legs 111-113 may respectively correspond to each of phases of the motor 130 to form an electrical connection.

A first leg 111 may include two switching elements S11, S12 connected to each other in series, and a connection node of the two switching elements S11, S12 may be connected to one end of a winding C1 of one phase in the motor 130 so that the AC power corresponding to one phase among a plurality of phases is input and output. Similarly, a second leg 12 may include two switching elements S13, S14 connected to each other in series, and a connection node of the two switching elements S13, S14 may be connected to one end of a winding C2 of one phase in the motor 130 so that AC power corresponding to one phase among a plurality of phases is input and output. Furthermore, a third leg 113 may include two switching elements S15, S16 connected to each other in series, and a connection node of the two switching elements S15, S16 may be connected to one end of a winding C3 of one phase among the plurality of phases in the motor 130 so that AC power corresponding to one phase is input and output.

The second inverter 120 may have a similar configuration as the first inverter 110. The second inverter 120 may have a plurality of legs 121-123 to which a DC voltage is applied from a second voltage source SOURCE 2. Each of the legs 121-123 may respectively correspond to a plurality of phases of the motor 130 to form an electrical connection.

A first leg 121 may include two switching elements S21, S22 connected to each other in series, and a connection node of the two switching elements S21, S22 may be connected to the other end of the winding C3 in the motor 130 so that AC power corresponding to one phase among a plurality of phases is input and output. Similarly, a second leg 122 may include two switching elements S23, S24 connected to each other in series, and a connection node of the two switching elements S23, S24 may be connected to the other end of the winding C2 of one phase among the plurality of phases in the motor 130 so that AC power corresponding to one phase is input and output. Furthermore, a third leg 123 may include two switching elements S25, S26 connected to each other in series, and a connection node of the two switching elements S25, S26 may be connected to the other end of the winding C1 of one phase in the motor 130 so that AC power corresponding to one phase among a plurality of phases is input and output The controller 170 is an element that switches the switching elements S11-S16, S21-S26 included in the first inverter 110 and the second inverter 120 through a pulse width modulation control so that the motor 130 may be driven based on the output required for the motor 130. The controller 170 may include a motor control unit MCU and a gate drive unit in the implementation. In the instant case, the motor control unit MCU may transmit a control signal for each of the first inverter 110 and the second inverter 120 to the gate drive unit at the command of the host controller, and the gate drive unit may transmit a driving signal to each inverter 110, 120 in response to the control signal. Here, the control signal and the driving signal may be a PWM signal but are not limited thereto.

A method of driving the motor 130 in an open end winding OEW mode and a closed end winding CEW mode in the motor driving apparatus described above will be described in the following.

First, the motor 130 may be driven by activating the first inverter 110 and the second inverter 120 and switching all the first switching elements S11-S16 and the second switching elements S21-S26 through the pulse width modulation control in the open end winding OEW mode.

For example, the motor may be driven in the open end winding mode when the controller 170 is configured to control the first switching elements S11-S126 of the first inverter 110 and the second switching elements S21-S26 of the second inverter 120 by a pulse width modulation upon receiving inputs such as the DC voltage of the first inverter 110 and the second inverter 120, a phase current supplied to the motor 130, and a motor angle detected by a motor rotor sensor provided in the motor 130. At the instant time, the first inverter 110 and the second inverter 120 may respectively invert the DC power supplied from the first voltage source SOURCE 1 and the second voltage source SOURCE 2 to AC power and supply the AC power to the motor 130.

The motor driving in the closed end winding CEW mode will be described with reference to FIG. 3.

Figure 3:
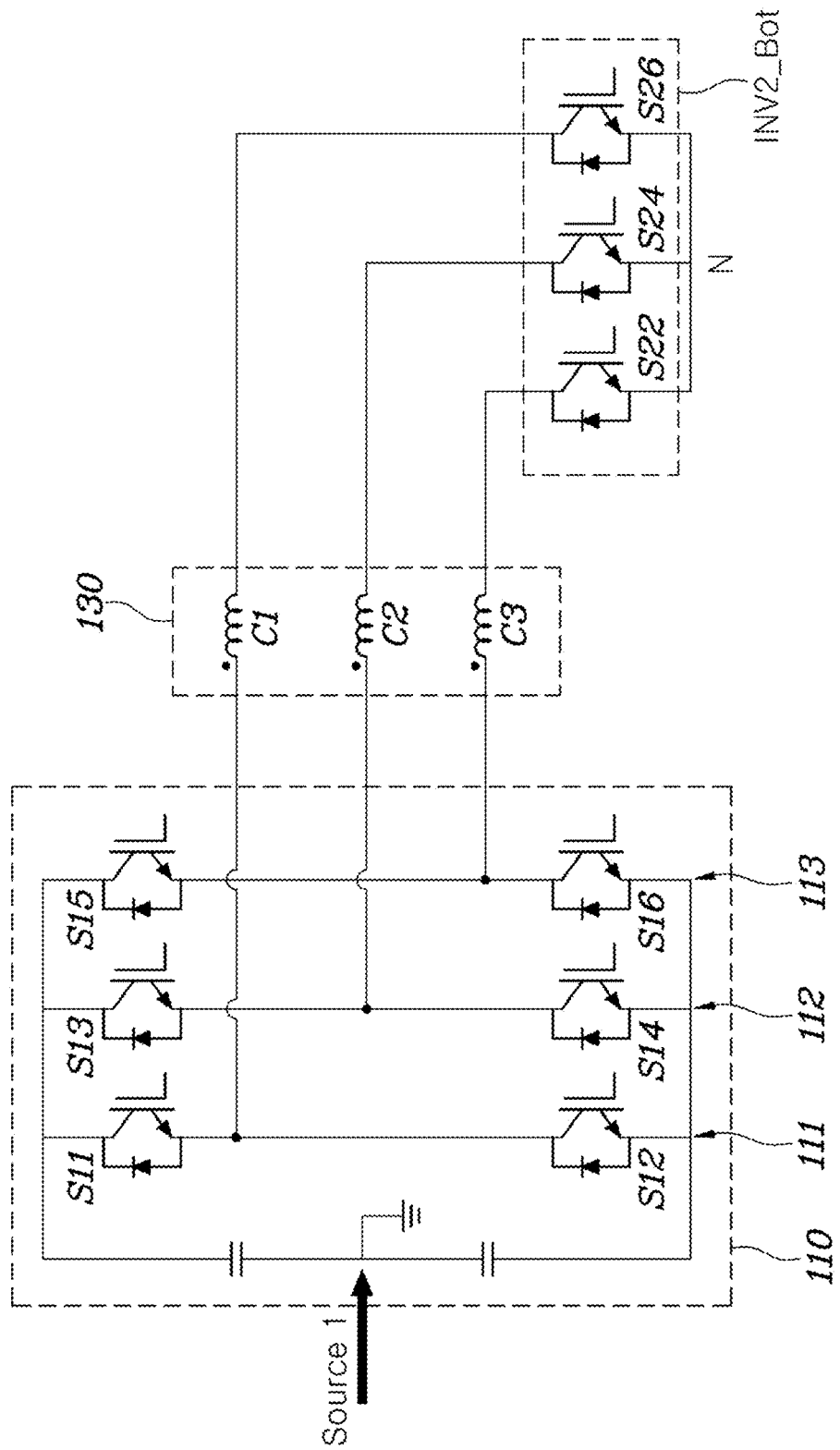
FIG. 3 is a circuit diagram for describing an implementation of a closed end winding mode in a motor driving apparatus according to an exemplary embodiment of the present disclosure.

FIG. 3 is a circuit diagram for describing the implementation of the closed end winding mode in a motor driving apparatus according to an exemplary embodiment of the present disclosure.

To implement the closed end winding mode in the motor driving apparatus according to the exemplary embodiment of the present disclosure, all the top phase switching elements S21, S23, S25 of the second inverter 120 may be deactivated and the bottom phase switching elements INV2_Bbot: S22, S24, S26 may be activated. Accordingly, the motor driving apparatus has a circuit configuration as illustrated in FIG. 3.

This connection configuration enables the other ends of the windings C1-C3 of the motor 130 to form an electrical connection with each other through the bottom phase switching elements INV2_Bot so that the motor 130 has a Y-connected winding configuration with a neutral N. Unlike the common motor driving apparatus configured to switch modes, the motor driving apparatus according to an exemplary embodiment of the present disclosure has two voltage sources Source 1, Source 2 and the voltage sources have grounds different from each other, which is not common, so that a changeover switch may be implemented by the bottom phase switching elements INV2_Bot.

After all, only the first switching elements S11-S16 of the first inverter 110 are switched through pulse width modulation control in the closed end winding mode in a state in which only the bottom phase switching elements of the second inverter 120 are activated, so that the motor 130 may be driven by the power of the first voltage source 1.

An effect of the motor driving apparatus according to the exemplary embodiment of the present disclosure will be described with reference to FIGS. 4 and 5.

Figure 4:
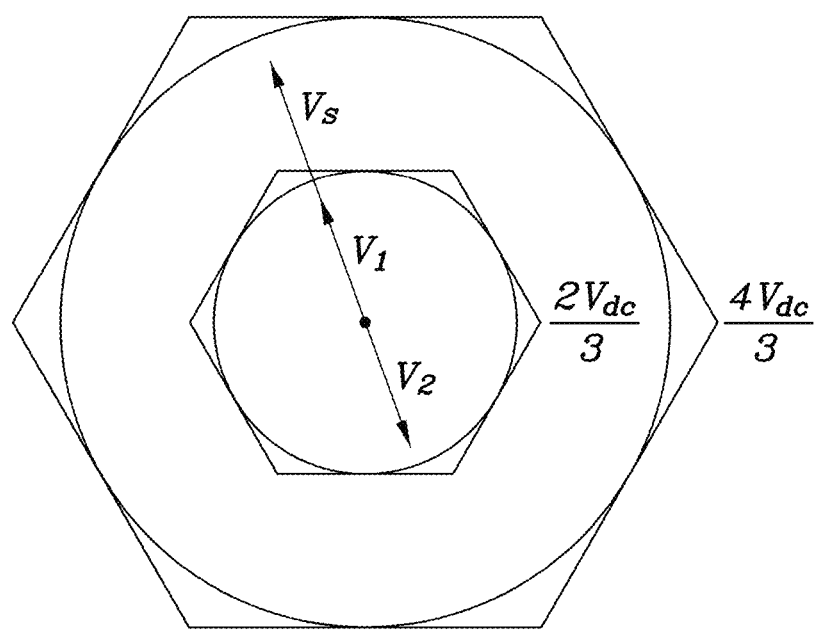
FIG. 4 is a view for describing a voltage utilization rate of a motor driving apparatus in an OEW mode according to an exemplary embodiment of the present disclosure.

FIG. 4 is a view for describing a voltage utilization rate of a motor driving apparatus in an OEW mode according to an exemplary embodiment of the present disclosure.

As described above, when two inverters are driven together in the OEW mode using a single voltage source, a common-mode current of an n-phase component in which the sum of three-phase currents is not zero is generated so that additional losses occur. However, according to the exemplary embodiment of the present disclosure, losses caused by the common-mode current are prevented in the motor driving apparatus according to the embodiment.

Furthermore, using a single voltage source necessitates use of only a voltage vector that makes the zero sequence voltage ZSV zero so that the voltage increases up to a maximum of $\sqrt{3}$ times the voltage in the CEW mode.

In contrast, according to the exemplary embodiment of the present disclosure, the motor driving apparatus employs two voltage sources including different grounds so that a differential voltage (Vs=V1−V2) of the voltage V1 of the first voltage source SOURCE 1 and the voltage V2 of the second voltage source SOURCE 2 may be applied to each end of the motor 130. Accordingly, the voltage utilization rate in OEW mode may increase up to twice the voltage utilization rate in CEW mode and the voltage increases beyond the maximum of $\sqrt{3}$ times the voltage of the motor driving apparatus in CEW mode illustrated in FIG. 1.

Accordingly, the current of the inverter may be reduced by up to half in the OEW mode compared with the CEW mode for the same output, increasing the efficiency.

Furthermore, unlike the motor driving apparatus illustrated in FIG. 1, the motor driving apparatus according to the exemplary embodiment of the present disclosure does not need the separate third switching element 40.

Figure 5:
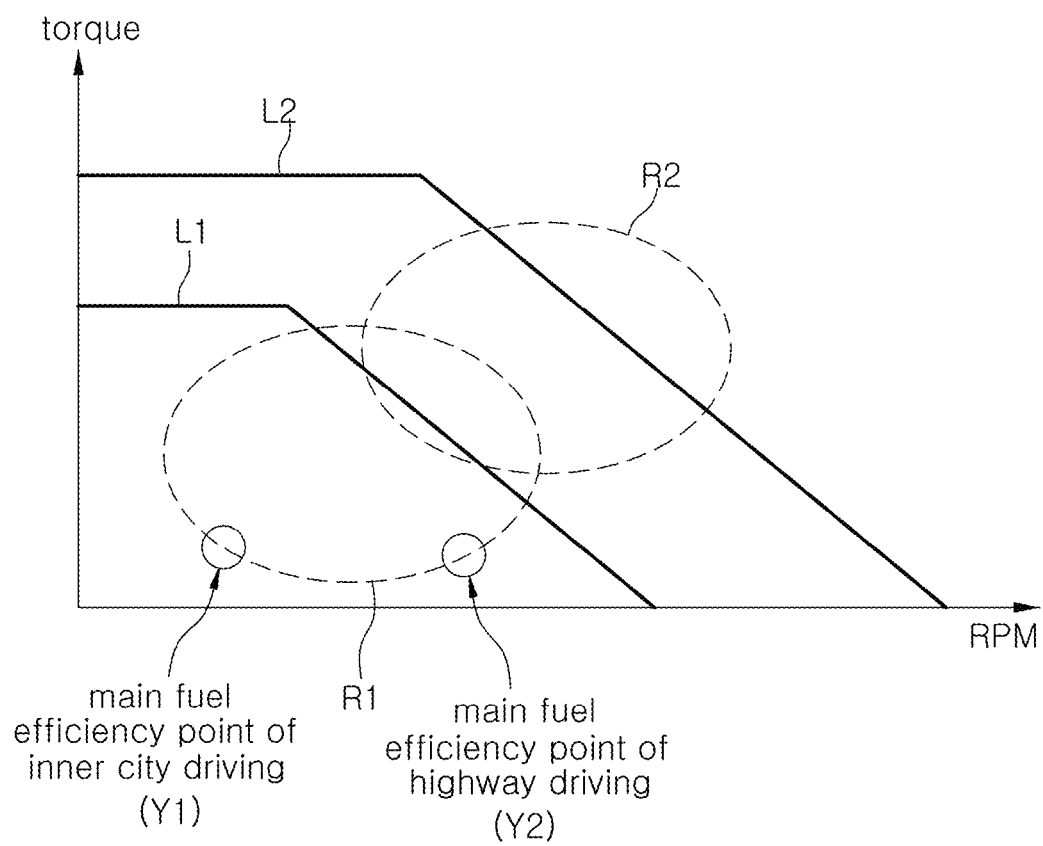
FIG. 5 is a view exemplarily illustrating rotation speed (RPM)-torque curves and high-efficiency regions by the motor driving modes of a motor driving apparatus according to an exemplary embodiment of the present disclosure.

FIG. 5 is a view exemplarily illustrating motor rotation speed (RPM)-motor torque curves and high-efficiency regions by the motor driving modes of a motor driving apparatus according to an exemplary embodiment of the present disclosure.

In FIG. 5, L1 represents a maximum torque line of the motor 130 in the CEW mode, and L2 represents a maximum torque line of the motor 130 in the OEW mode.

As described above, according to the exemplary embodiment of the present disclosure, the motor driving apparatus is configured to control the first inverter 110 using the first voltage source 1 through activating the bottom phase switching elements INV2_Bot of the second inverter 120 to drive the Y-connected motor in the CEW mode and controls the first inverter 110 and the second inverter 120 using two voltage sources Source 1, Source 2 to drive the open end winding motor in the OEW mode.

As illustrated in FIG. 5, when the vehicle is driven by the motor 130, the main vehicle operating point is an operating point Y1 during inner-city driving and an operating point Y2 during highway driving, and the operating points Y1, Y2 are included in a high-efficiency region of the motor-inverter system.

According to the exemplary embodiment of the present disclosure, when the vehicle is driven by the motor 130, the high-efficiency region of the motor-inverter system includes the main operating points Y1, Y2 in the CEW mode. Because the efficiency of the motor-inverter system is determined by the voltage utilization rate of the inverter, the number of turns of the windings C1-C2 of the motor 130 is determined in a first driving mode so that a region R1, in which the voltage utilization rate of the inverter may be judged excellent and which is equal to or greater than a preset reference value, includes the main operating points Y1, Y2 of the vehicle.

On the other hand, when the OEW driving mode is applied, it is difficult for a region R2, in which the voltage utilization rate of the motor-inverter system may be judged excellent as the motor output increases and which is equal to or greater than a preset reference value, to include the main operating points Y1, Y2. Accordingly, as described above, the motor 130 is driven in the CEW mode to improve efficiency in a low-torque region to which the main operating points Y1, Y2 belong to, that the motor 130 is driven in the OEW mode in a section in which high output is needed to perform driving that reduces the output current of the inverter and reduces the power semiconductor usage.

Furthermore, to further improve the efficiency of the CEW mode performed in the low-torque region to which the main operating points Y1, Y2 belong, the switching elements S11-S16 applied to the first inverter 110 adopt the MOSFET made of SiC which is a material with relatively low loss. In contrast, the switching elements S21-S26 applied to the second inverter 120 operating in a high output region except for the neutral formation for the CEW mode adopt an IGBT made of Si which is an inexpensive material. However, the present disclosure is not necessarily limited to the presented examples.

Next, a method of controlling a motor driving apparatus will be described with reference to FIG. 6

Figure 6:
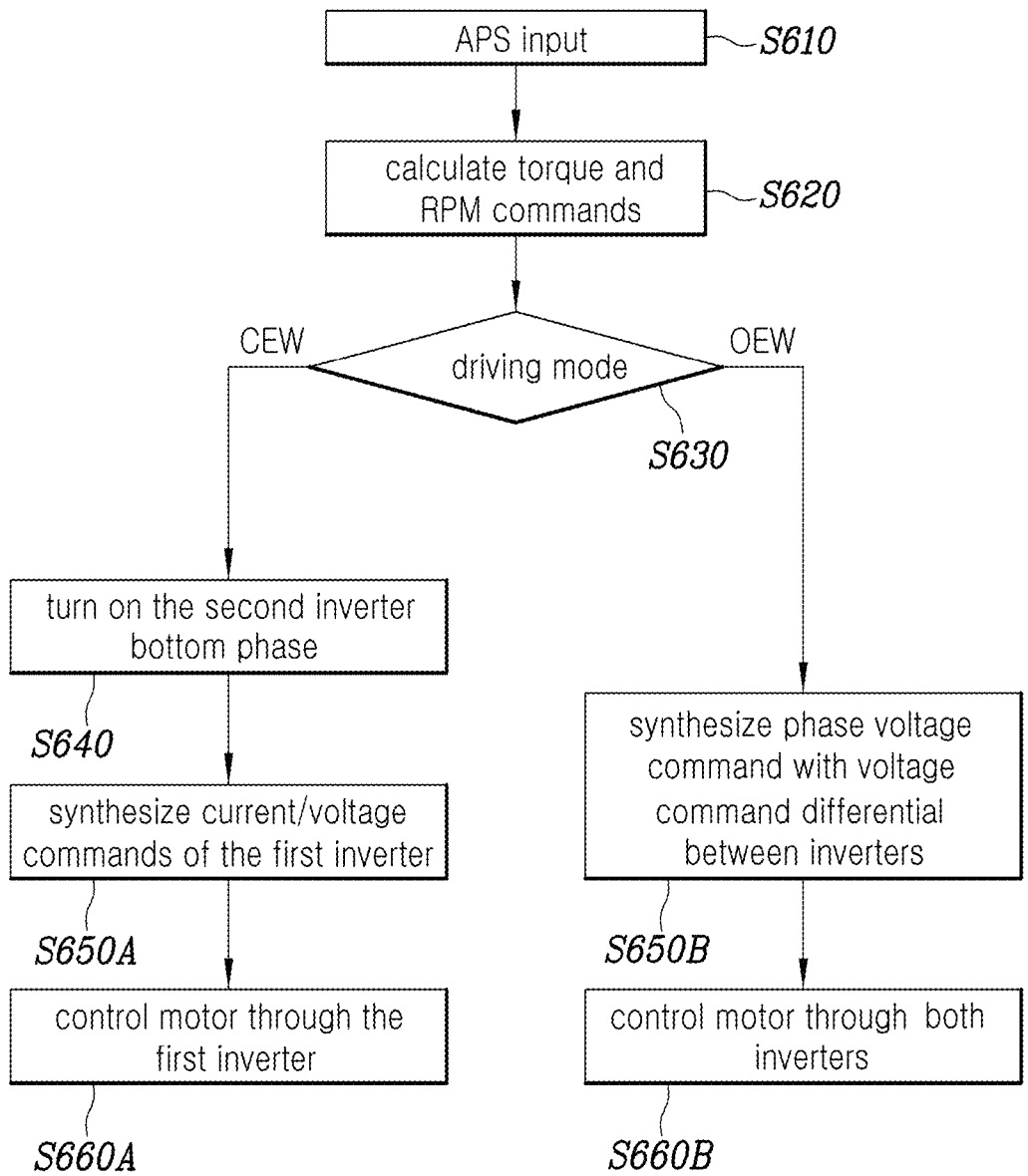
FIG. 6 is a flowchart of an exemplary method of controlling a motor driving apparatus according to an exemplary embodiment of the present disclosure.

FIG. 6 is a flowchart of an exemplary method of controlling a motor driving apparatus according to an exemplary embodiment of the present disclosure.

FIG. 6 shows that the motor control method according to an exemplary embodiment of the present disclosure may start with receiving by the controller 170 of an input of required output (required torque) of the motor 130 from an outside host controller and the like once the motor starts to be driven.

The host controller is configured to receive an input of a value of an accelerator pedal position sensor APS (S610) and determine, based on the input, the required torque or required output of the driver. The host controller may be configured to determine a torque or revolutions per minute (rpm) command for the motor 130 and transmit the command to the controller 170 to meet the torque or output requirement (S620). Here, the host controller may be a vehicle control unit VCU in the case of an electric vehicle EV or a hybrid control unit HCU in the case of a hybrid electric vehicle HEV, depending on a vehicle type. However, the present disclosure is not necessarily limited to the presented examples.

The controller 170 may determine the driving mode of the motor 130 based on the command received from the host controller (S630).

For example, the controller 170 may determine the driving mode to be the CEW mode when the required torque or required output dictated by the transmitted command is less than a preset reference value and determine the drive mode to be the OEW mode when the required torque or required output is equal to or greater than a preset reference value. However, the present disclosure is necessarily not limited to the mode determination criteria presented as an example.

When it is determined that the motor is to be driven in the CEW mode, the controller 170 may activate the bottom phase switching elements INV2_Bot and deactivate the top-phase switching elements of the inverter 120. Accordingly, the other end of each winding of the motor 130 is connected to one end of each bottom phase switching element, and the other ends of the bottom phase switching elements INV2_Bot are connected to each other to form a neutral. That is, the windings of the motor 130 are in the Y-connection state through a selective switching element control in the second inverter 120 (S640).

Furthermore, the controller 170 may synthesize the current and voltage commands of the first inverter 110 (S650A) and perform motor control through the first inverter 110 (S660A).

In contrast, when it is determined that the motor is to be driven in the OEW mode, the controller may synthesize the phase voltage command with a differential voltage which is the difference between the voltage command for the first inverter 110 and the voltage command for the second inverter 120 (S650B) and perform the motor control through the first inverter 110 and the second inverter 120 (S660B).

On the other hand, the exemplary embodiment of the present disclosure needs two voltage sources. To the present end, a fuel cell including two voltage sources may be employed, or a battery pack including a plurality of modules may be divided into two for use. The present disclosure is not limited to these examples. Any type of voltage source may be employed as long as ground separation is possible.

As described above, according to various embodiments of the present disclosure, the motor driving apparatus may determine the driving mode of the motor based on the required output for the motor, improve the system efficiency by ensuring that the main operating points of the vehicle are included in a high-efficiency section of the motor-inverter system in the low output section, and realize high torque in the OEW mode in the high output section Accordingly, according to the various embodiment of the present disclosure, the motor driving apparatus may improve efficiency in the entire torque section, compared with the conventional Y-connected motor driven with one inverter. Furthermore, the motor driving apparatus may avoid common-mode current loss, improve the voltage utilization rate, and do without a separate switching element for mode switching, compared with a motor driving apparatus of driving two inverters with a single voltage source.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus of driving a motor including a plurality of windings respectively corresponding to a plurality of phases, the motor driving apparatus comprising:
a first inverter including a plurality of first switching elements and connected to a first end of each of the windings;
a second inverter including a plurality of second switching elements and connected to a second end of each of the windings; and
a controller configured to control ON/OFF states of the first switching elements and the second switching elements based on a required output of the motor,
wherein the first inverter is connected to a first voltage source, the second inverter is connected to a second voltage source, and the first voltage source and the second voltage source have different grounds, and
wherein when the controller concludes that the motor is to be driven in an Open End Winding (OEW) mode, the controller is configured to synthesize a phase voltage command with a differential voltage which is a difference between a voltage command for the first inverter and a voltage command for the second inverter and perform control of the motor through the first inverter and the second inverter.

2. The motor driving apparatus of claim 1, wherein each of the first inverter and the second inverter includes a DC-link positive DCP and a DC-link negative DCN, and the DC-link positive DCP and the DC-link negative DCN of each of the first inverter and the second inverter are electrically disconnected from each other.

3. The motor driving apparatus of claim 1, wherein the controller is further configured to turn on bottom phase switching elements among the plurality of second switching elements and turn off top phase switching elements among the plurality of second switching elements when a preset first condition is satisfied.

4. The motor driving apparatus of claim 3, wherein the windings of the motor are connected to the first inverter in a Y-connected form when the top phase switching elements are turned off and the bottom phase switching elements are turned on.

5. The motor driving apparatus of claim 4, wherein a first end of each of the bottom phase switches is connected to the second end of each of the windings and second ends of the bottom phase switches are respectively connected to each other to form a neutral when the top phase switching elements are turned off and the bottom phase switching elements are turned on.

6. The motor driving apparatus of claim 4, wherein the controller is further configured to control the plurality of first switching elements through pulse width modulation to drive the motor in a state in which the top phase switching elements are turned off and the bottom phase switching elements are turned on.

7. The motor driving apparatus of claim 3, wherein when the controller concludes that the motor is to be driven in a Closed End Winding (CEW) mode, the controller is configured to activate the bottom phase switching elements and deactivate the top-phase switching elements.

8. The motor driving apparatus of claim 7, wherein the controller is configured to synthesize current and voltage commands of the first inverter and perform motor control through the first inverter.

9. The motor driving apparatus of claim 1, wherein the controller is further configured to control the first switching elements and the second switching elements through pulse width modulation to drive the motor when a preset second condition is satisfied.

10. A motor driving apparatus for driving a motor including a plurality of windings respectively corresponding to a plurality of phases, the motor driving apparatus comprising:
a first inverter including a plurality of first switching elements and connected to a first end of each of the windings;
a second inverter including a plurality of second switching elements and connected to a second end of each of the windings; and
a controller configured to control ON/OFF states of the first switching elements and the second switching elements based on a required output of the motor,
wherein the first inverter is connected to a first voltage source, the second inverter is connected to a second voltage source, the first voltage source and the second voltage source have different grounds, and
wherein the controller is further configured to:
turn on only bottom phase switching elements among the plurality of second switching elements to form a Y-connection of the windings,
control the plurality of first switching elements through pulse width modulation to drive the motor as a closed end winding motor when a preset first condition is satisfied, and
control the first switching elements and the second switching elements through pulse width modulation to drive the motor as an open end winding motor when a preset second condition is satisfied, and
wherein when the controller concludes that the motor is to be driven in an Open End Winding (OEW) mode, the controller is further configured to synthesize a phase voltage command with a differential voltage which is a difference between a voltage command for the first inverter and a voltage command for the second inverter and perform control of the motor through the first inverter and the second inverter.

11. The motor driving apparatus of claim 10, wherein each of the first inverter and the second inverter includes a DC-link positive DCP and a DC-link negative DCN, and the DC-link positive DCP and the DC-link negative DCN of each of the first inverter and the second inverter are electrically disconnected from each other.

12. The motor driving apparatus of claim 10, wherein a first end of each bottom phase switch is connected to the second end of each of the windings and second ends of the bottom phase switches are respectively connected to each other to form a neutral when only the bottom phase switching elements are turned on among the plurality of second switching elements.

13. The motor driving apparatus of claim 10, wherein when the controller concludes that the motor is to be driven in a Closed End Winding (CEW) mode, the controller is configured to activate the bottom phase switching elements and deactivate top-phase switching elements of the second inverter.

14. The motor driving apparatus of claim 13, wherein the controller is configured to synthesize current and voltage commands of the first inverter and perform motor control through the first inverter.

* * * * *